US010581287B2

United States Patent
Swales et al.

(10) Patent No.: US 10,581,287 B2
(45) Date of Patent: Mar. 3, 2020

(54) PERMANENT MAGNET ELECTRIC MACHINE WITH VARIABLE MAGNET ORIENTATION

(71) Applicant: GM GLOBAL TECHNOLOGY OPERATIONS LLC, Detroit, MI (US)

(72) Inventors: Shawn H. Swales, Canton, MI (US); Khwaja M. Rahman, Troy, MI (US); Craig S. Ross, Ypsilanti, MI (US); Goro Tamai, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 132 days.

(21) Appl. No.: 15/860,239

(22) Filed: Jan. 2, 2018

(65) Prior Publication Data

US 2019/0207447 A1 Jul. 4, 2019

(51) Int. Cl.
*H02K 1/27* (2006.01)
*H02K 1/30* (2006.01)
*H02K 21/02* (2006.01)

(52) U.S. Cl.
CPC .............. *H02K 1/30* (2013.01); *H02K 1/276* (2013.01); *H02K 1/2766* (2013.01); *H02K 21/028* (2013.01)

(58) Field of Classification Search
CPC ............ H02K 1/24; H02K 1/246; H02K 1/27; H02K 1/276; H02K 1/2766; H02K 1/278; H02K 1/279; H02K 1/2793; H02K 1/28; H02K 21/00; H02K 21/02; H02K 21/028; H02K 7/00; H02K 7/11; H02K 7/116; H02K 16/00; H02K 16/02; H02K 15/00; H02K 15/03
See application file for complete search history.

(56) References Cited

U.S. PATENT DOCUMENTS

| | | | | |
|---|---|---|---|---|
| 4,598,221 A | * | 7/1986 | Lawson | H02K 53/00 310/103 |
| 4,629,921 A | * | 12/1986 | Gavaletz | H02K 1/2746 310/156.01 |
| 5,684,352 A | * | 11/1997 | Mita | H02K 1/02 310/152 |
| 6,031,311 A | * | 2/2000 | Lee | H02K 1/2766 310/156.57 |
| 6,455,972 B1 | * | 9/2002 | Asao | H02K 3/12 310/184 |

(Continued)

*Primary Examiner* — Tran N Nguyen
(74) *Attorney, Agent, or Firm* — Quinn IP Law

(57) ABSTRACT

A permanent magnet electric machine (PM machine) includes a rotor with rotatable magnets and a stator defining an air gap with the rotor. An actuator rotates the rotatable magnets at predetermined operating points through an angular distance sufficient for changing magnetic pole orientations of the rotatable magnets, and thus modifies magnetic flux linkage with stator windings across the air gap. Fixed magnets may be arranged around a circumference of the rotor. The actuator may be actively or passively driven. Flux-shunting elements are optionally disposed in the rotor to further modify the flux linkage. A gear set connected to torque transfer elements may be driven by the actuator to rotate the rotatable magnets. A vehicle includes drive wheels, a transmission, and the PM machine. A method controls magnetic flux linkage in the PM machine noted above.

20 Claims, 6 Drawing Sheets

(56) References Cited

U.S. PATENT DOCUMENTS

| | | | | |
|---|---|---|---|---|
| 6,897,590 B2* | 5/2005 | Popov | ............... | H02K 1/2773 |
| | | | | 310/156.23 |
| 6,927,519 B2* | 8/2005 | Popov | ............... | H02K 1/2766 |
| | | | | 310/156.47 |
| 7,385,328 B2* | 6/2008 | Melfi | ............... | H02K 1/278 |
| | | | | 310/156.45 |
| 7,969,055 B2* | 6/2011 | Titus | ............... | H02K 53/00 |
| | | | | 310/152 |
| 2005/0174004 A1* | 8/2005 | Takehara | ............ | H01F 13/003 |
| | | | | 310/156.43 |
| 2008/0169717 A1* | 7/2008 | Takashima | ............ | H02K 1/276 |
| | | | | 310/114 |
| 2008/0224559 A1* | 9/2008 | Niguchi | ............ | H02K 1/2733 |
| | | | | 310/156.62 |
| 2011/0101812 A1* | 5/2011 | Finkle | ............... | H02K 21/028 |
| | | | | 310/156.24 |
| 2011/0273047 A1* | 11/2011 | Palfai | ............... | H02K 1/2766 |
| | | | | 310/156.01 |
| 2013/0300354 A1* | 11/2013 | Ichikawa | ............ | H01F 38/14 |
| | | | | 320/108 |
| 2014/0091656 A1* | 4/2014 | Miyashita | ............ | H02K 3/28 |
| | | | | 310/71 |

* cited by examiner

PERMANENT MAGNET ELECTRIC MACHINE WITH VARIABLE MAGNET ORIENTATION

INTRODUCTION

Electric machines in the form of traction motors and electric generators are used to generate torque in a wide variety of electromechanical systems. Electric machines typically include a rotor and coupled rotor shaft that are concentrically positioned with respect to a stator. The rotor shaft begins to rotate when the electric machine is energized by a high-voltage power supply, such as an inverter and multi-cell battery pack. Motor torque transmitted by the rotor shaft may be used to perform work in the electromechanical system, such as for generating electricity, cranking and starting an engine, or propelling a vehicle.

In a permanent magnet-type electric machine (PM machine) in particular, magnets constructed of a rare earth material are surface-mounted to or embedded within the material of rotor. A core of the stator defines multiple slots that are individually wound with conductive wires or bars to form the stator windings. The stator windings are sequentially energized by a polyphase input voltage to produce a rotating electromagnetic field. The rotating electromagnetic field in turn interacts with the permanent magnetic fields of the rotor. Such field interaction occurs in a magnetic circuit in which magnetic flux paths extend across a small air gap from the rotor into the stator. Motor torque from the PM machine is thus generated by the interaction of the rotor's magnetic field, which is created by the magnets, with the stator's magnetic field as created by external control of the input voltage.

SUMMARY

A permanent magnet-type electric machine ("PM machine") is disclosed herein in which magnetic north-south pole orientations of a set of permanent magnets are actively or passively adjusted such that the electric machine enjoys variable reluctance and flux characteristics at different operating points. The controlled change in the magnetic pole orientations enables magnetic flux between the rotor and stator to be modified in real time, for instance with magnetic flux between the rotor and stator being reduced above a threshold rotational speed and below a threshold output torque of the rotor.

Relative to an internal combustion engine, a PM machine is a relatively efficient generator of torque under low-speed/high-torque conditions. Such conditions may be present when motor torque is directed to drive wheels of a motor vehicle to accelerate from a standstill. At higher speeds, motor losses increase due to flux energy loss caused by the rotating magnets and a requirement for field-weakening. High-speed/low-torque operating points may therefore result in flux-related losses that, if reduced, would benefit a system employing such a PM machine. The disclosed PM machine is intended to provide a possible solution to this particular phenomenon without compromising the structural integrity and packaging requirements of the electric machine.

In an example embodiment, the PM machine includes a rotor that is splined or otherwise connected to a rotor shaft. The PM machine also includes a stator and an actuator. Rotatable magnets are connected to the rotor. The stator is spaced art from the rotor by an air gap such that magnetic flux paths exist between the stator and the rotor.

The actuator selectively rotates the rotatable magnets, either actively or passively, at one or more predetermined operating points of the PM machine. Rotation occurs through an angular distance that is sufficient for changing the north-south magnetic pole orientations of the rotatable magnets to a desired extent, e.g., up to 180° or more depending on the application. Rotation either clockwise or counter-clockwise may be possible depending on the operating mode, e.g., while motoring or in a regenerating mode. The reluctance, and thus the magnetic flux paths between the rotor and the stator, is modified in this manner, i.e., by modifying a level of magnetic flux linkage with stator windings across the air gap.

The rotor may optionally include fixed magnets arranged around a circumference of the rotor in alternating north-south magnetic pole orientations. The angular distance noted above is sufficient for counteracting magnetic flux from the fixed magnets. The rotor has an outer diameter defined by an outer perimeter wall and an inner diameter defined by an inner perimeter wall. A respective one of the rotatable magnets may be positioned adjacent to one or more of the fixed magnets at a position adjacent to the inner perimeter wall.

A respective one of the rotatable magnets may be positioned adjacent to a respective one of the optional fixed magnets to form a pole pair therewith. Optionally, a flux-shunting element may be disposed at each pole pair, either as a separate component from the rotatable magnets or a part thereof. The flux-shunting element possibly having a non-uniform material composition and/or shape and an adjustable orientation, such that non-uniform magnetic permeability properties exist on diametrically-opposite halves of the flux-shunting element. Orientation of the flux-shunting element may be used to further affect the flux between the rotor and stator, with the flux-shunting element possibly including another magnet as part of its construction.

The actuator may be configured to selectively rotate the rotatable magnets at one or more predetermined operating points of the PM machine. The predetermined operating point(s) may be predetermined torque-speed operating points of the PM machine, with the predetermined torque-speed operating points corresponding to one or more rotational speeds of the rotor exceeding corresponding threshold speeds and motor torques of the rotor that are less than corresponding threshold motor torques.

A controller may be in communication with the actuator, with the actuator rotating the rotatable magnets, and possibly the optional flux-shunting elements, in response to a control signal from the controller. The actuator may include a spring mechanism or other passive element configured to bias the rotatable magnets/optional flux-shunting elements in a first predetermined rotational direction below a threshold acceleration force of the rotor, and to enable rotation of the rotatable magnets/optional flux-shunting elements in a second predetermined rotational direction above the threshold acceleration force of the rotor.

A vehicle is also disclosed herein having drive wheels, a transmission, and a PM machine. The transmission has an input member and an output member, with the output member being connected to the drive wheels. The PM machine delivers motor torque to the input member and is configured as described above.

A method is also disclosed herein for controlling flux in a PM machine. The method includes connecting a plurality of rotatable magnets to a rotor such that the rotatable magnets have a respective north-south magnetic pole orientation. The method also includes positioning a stator with respect the rotor such that the stator circumscribes the rotor and defines an air gap in conjunction therewith. Additionally, the method includes selectively rotating the rotatable magnets, via an actuator, at one or more predetermined operating points of the PM machine, through an angular distance sufficient for changing the respective north-south magnetic pole orientations and thereby modifying a level of magnetic flux linkage with stator windings across the air gap.

The above-noted and other features and advantages of the present disclosure will be readily apparent from the following detailed description of the embodiments and best modes for carrying out the disclosure when taken in connection with the drawings and appended claims.

Figure 1:
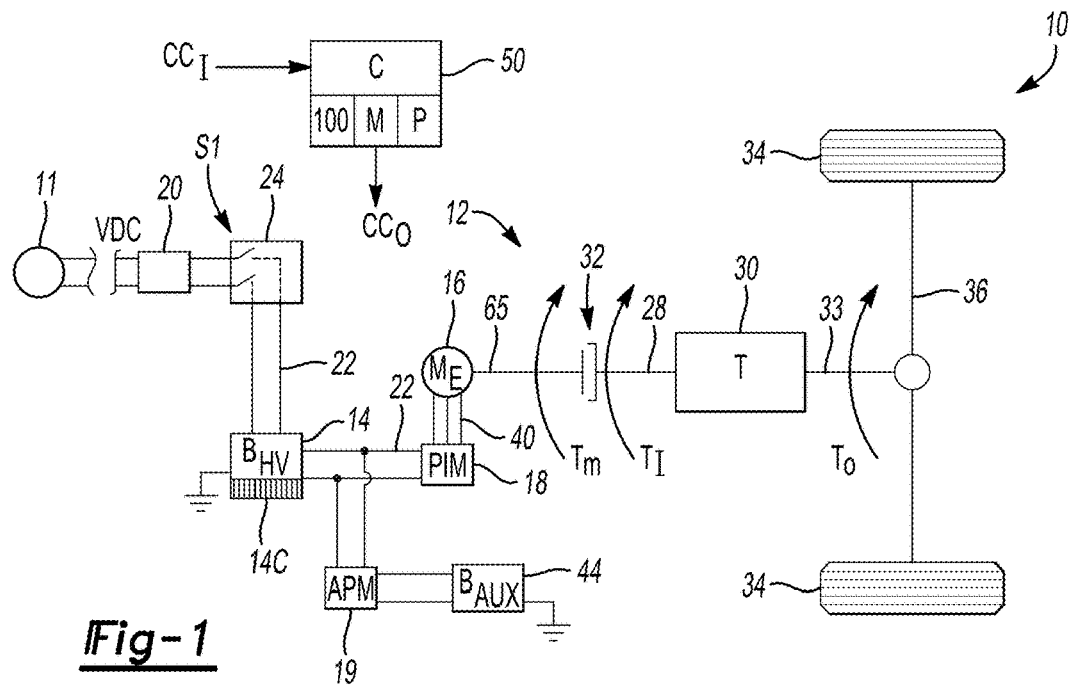
FIG. 1 is a schematic illustration of an example vehicle having a permanent magnet-type electric machine (PM machine) with variable magnetic pole orientations as set forth herein.

The present disclosure is susceptible to various modifications and alternative forms, and some representative embodiments have been shown by way of example in the drawings and will be described in detail herein. It should be understood, however, that the novel aspects of this disclosure are not limited to the particular forms illustrated in the appended drawings. Rather, the disclosure is to cover all modifications, equivalents, combinations, sub-combinations, permutations, groupings, and alternatives falling within the scope and spirit of the disclosure as defined by the appended claims.

DETAILED DESCRIPTION

Referring to the drawings, wherein like reference numbers refer to like components, FIG. 1 depicts an example motor vehicle 10 having an electric powertrain 12. The electric powertrain 12 includes a high-voltage battery pack ($B_{HV}$) 14 having a plurality of battery cells 14C. The battery pack 14 is electrically connected to a permanent magnetic-type electric machine ($M_E$) 16, hereinafter referred to as the PM machine 16, constructed with a variable magnetic orientation as set forth below with reference to FIGS. 3A-8B. In certain embodiments, the PM machine 16 may be used as an electric traction motor aboard the motor vehicle 10 to generate motor torque (arrow $T_M$) at a level sufficient for propelling the vehicle 10, as an electrical generator, and/or for performing other useful work.

Applications of the PM machine 16 shown in FIG. 1 are not limited to mobile or vehicular applications in general, or to motor vehicle propulsion applications in particular. Those of ordinary skill in the art will appreciate that the attendant benefits of the disclosed PM machine 16 when constructed as described below with reference to FIGS. 3A-8B may be extended to stationary and mobile applications that rely on the use of the motor torque (arrow $T_m$), particularly under high-speed/low-torque operating conditions of the PM machine 16.

Figure 2:
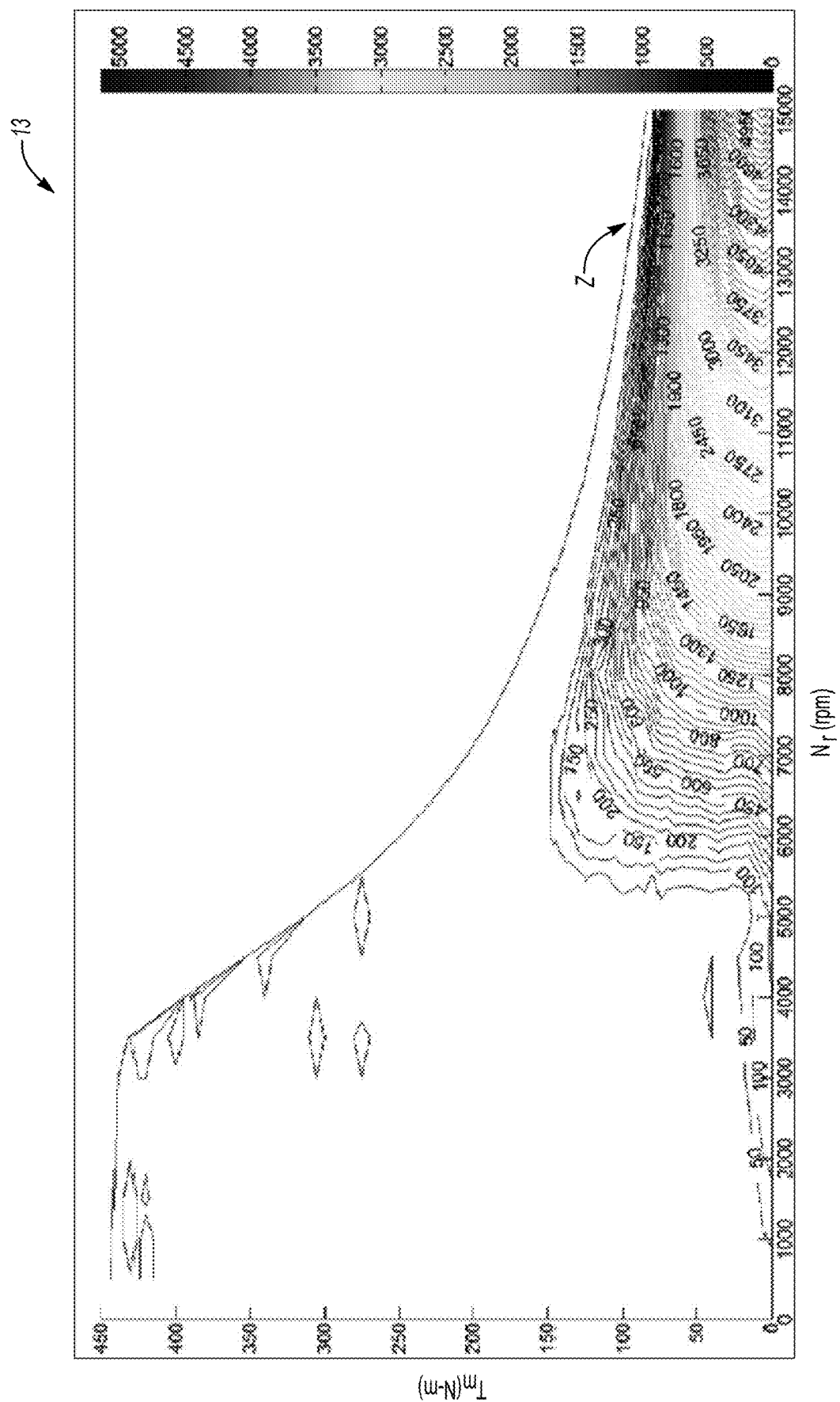
FIG. 2 is an example motor speed-torque plot, with motor torque depicted on the vertical axis and motor speed depicted on the horizontal axis.

As a foundational basis for the present disclosure, and referring briefly to the example torque-speed operating plot 13 of FIG. 2, it is recognized herein that PM machines typically experience relatively high losses as a percentage of useful power when operated at a high motor speed ($N_r$) and a low load or motor torque ($T_m$), with motor speed ($N_r$) depicted on the horizontal axis and stated in revolutions per minute (rpm) and motor torque ($T_m$) depicted on the vertical axis and stated in Newton-meters (N-m). A representative contour is shown in FIG. 2 indicated at zone Z wherein magnetic flux is excessive and flux reduction would lower losses in the PM machine, an inverter, and associated power electronics.

The zone (Z) is indicative of the relatively large fixed magnetic fields emanating from magnets of a typical PM machine, e.g., large rectangular bar magnets embedded in opposing slots to form north-south pole pairs around a circumference of a rotor of such a PM machine. That is, a magnetic circuit exists between a rotor and a stator of a typical PM machine, across a small air gap there between. Flux may be generated in excess when, as in zone Z, the generated excess magnetic flux is detrimental to motor efficiency and produces higher losses. A solution proposed herein is the addition of flux leakage in main flux paths of the magnetic circuit, such that the excess magnetic flux can be reduced in zone Z of FIG. 2.

The PM machine 16 of FIG. 1 is thus configured with a variable magnetic pole orientation intended to improve efficiency of the PM machine 16 by reducing such excess flux. This goal may be accomplished by selectively varying magnetic north-south pole orientations within the PM machine 16. Such modifications in turn modify the above-noted magnetic flux paths. Various embodiments for implementing the disclosure are described in further detail below with reference thereto FIGS. 3A-8B, including some embodiments in which the modifications to the flux paths are assisted by interposing optional "flux-shunting" elements having disparate magnetic permeability characteristics due to non-uniform geometry and/or materials of construction, particularly with respect to diametrically opposite sides or halves of such flux-shunting elements.

Returning to FIG. 1, the battery pack 14 may be optionally recharged via an offboard charging station 11, for instance a direct current (DC) fast-charging station as shown, with the charge possibly delivered directly to the battery pack 14 using an applied DC voltage (VDC) via a charge coupling device 20, to a DC voltage bus 22 via a voltage regulator 24 having one or more internal semiconductor and/or mechanical switches 51, or via an available alternating current charging system (not shown).

The electric powertrain 12 also includes a power inverter module (PIM) 18 that is electrically connected to the battery pack 14 via the DC voltage bus 22. Internal semiconductor switches (not shown) of the PIM 18 are automatically controlled via pulse width modulation or other desired switching techniques in order to generate an alternating current (AC) output voltage suitable for energizing the PM machine 16. An AC voltage bus 40 is used to electrically connect the PIM 18 to the individual phase windings of the PM machine 16. A DC-to-DC converter/auxiliary power module (APM) 19 may be used to reduce a voltage level of the DC voltage bus 22 to a lower auxiliary level, e.g., 12-15 VDC, which in turn may be stored in an auxiliary battery ($B_{AUX}$) 44 for use in energizing low-voltage electrical systems aboard the vehicle 10.

A rotor shaft 65 of the PM machine 16 may be selectively connected to a load, e.g., an input member 28 of a transmission (T) 30, via operation of an input clutch 32. The rotor shaft 65 rotates and thereby delivers an input torque (arrow $T_I$) to the input member 28 of the transmission 30 when the PM machine 16 is operated as an electric traction motor, and/or the PM machine 16 may be operated as a generator as needed. The motor output torque (arrow $T_m$) from the energized PM machine 16 may be directed to the input member 28 and/or to another load in the form of an output member 33 of the transmission 30 and a set of drive wheels 34 connected to the output member 33 depending on the configuration of the electric powertrain 12. Output torque (arrow $T_O$) from the transmission 30 may be transmitted to the drive wheels 34 via one or more drive axles 36.

An optional controller (C) 50 may be used to control ongoing operation of the PM machine 16 responsive to input signals (arrow $CC_I$), doing so via transmission of control signals (arrow $CC_O$) to the PM machine 16. For example, the controller 50 may monitor rotational speed and torque of the PM machine 16 and actively control a magnetic north-south pole orientation of some or all of the magnets, e.g., at predetermined torque-speed operating points or as otherwise needed. The controller 50 may be embodied as one or more electronic control units having the requisite memory (M) and a processor (P), as well as other associated hardware and software, e.g., a clock or timer, input/output circuitry, etc. Memory (M) may include sufficient amounts of read only memory, for instance magnetic or optical memory. Instructions embodying a control method may be programmed as computer-readable instructions 100 into the memory (M) and executed by the processor(s) (P) during operation of the vehicle 10 to selectively change the magnetic pole orientation of magnets of the PM machine 16 and thereby optimize operating efficiency.

Figure 3A:
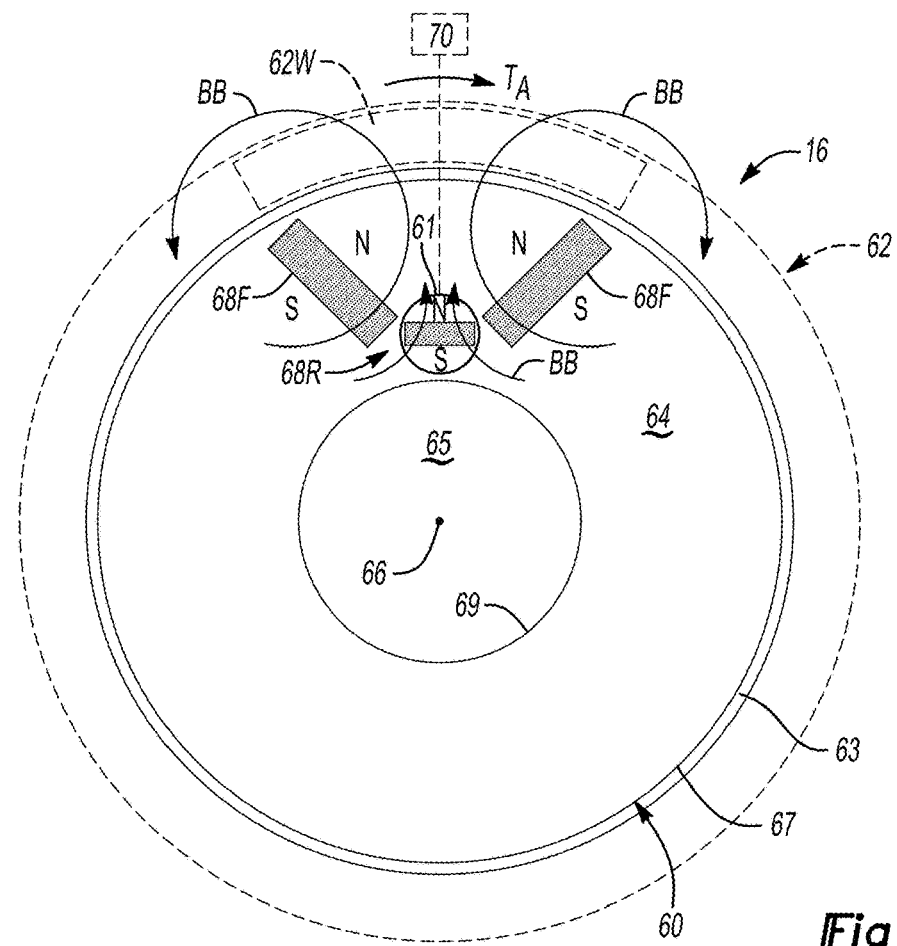
FIGS. 3A, 3B, and 3C are schematic plan view illustrations of a rotor usable with the PM machine of FIG. 1 according to example configurations.

FIG. 3A depicts a possible embodiment of the electric machine 16 having a rotor assembly 60 coaxially surrounded/circumscribed by a stator 62, with the scale of the stator 62 in terms of radial thickness being reduced in FIG. 3A for the purpose of illustrative clarity. The rotor assembly 60 is substantially cylindrical in shape, i.e., generally circular in cross-section and thus forming a right cylinder with respect to an axis of rotation 66 of the rotor assembly 60, with possible variations due to manufacturing tolerances, surface features, and connected components. The stator 62, which axially surrounds and thus fully circumscribes the rotor assembly 60, is separated from the rotor assembly 60 by a small air gap 63, such that magnetic flux paths (arrows BB) exist between the rotor assembly 60 and the stator 62 across the air gap 63. Thus, the stator 62 is part of a magnetic circuit through which magnetic flux flows through the flux paths (arrows BB) from the rotor assembly 60, across an air gap 63, and into the stator 62.

The rotor assembly 60 includes a generally cylindrical rotor 64 splined, integrally formed with, or coupled to the rotor shaft 65 and rotatable therewith about the axis of rotation 66. For instance, the rotor shaft 65 is splined or otherwise joined to the rotor 64, with such splines omitted for clarity. The rotor 64 includes a plurality of rotatable magnets 68R, i.e., permanent magnets. While the particular configuration of the rotatable magnets 68R may vary within the scope of the disclosure, one possible embodiment includes affixing a solid bar magnet to a rotatable plate 61 as shown, or alternatively constructing the entirety of the rotatable plate 61 as a permanent magnet of a predetermined field strength.

The rotor 64 may also include an optional set of fixed magnets 68F. That is, the various permanent magnets used in the construction of the rotor assembly 60 may be the rotatable magnets 68R, exclusively, or the rotatable magnets 68R may be used in conjunction with the fixed magnets 68F, with the fixed magnets 68F arranged around a circumference of the rotor 64 in alternating north-south magnetic pole orientations. A respective one of the rotatable magnets 68R may be positioned adjacent to one or more of the fixed magnets 68F at a position adjacent to the inner perimeter wall 69.

Figure 3B:
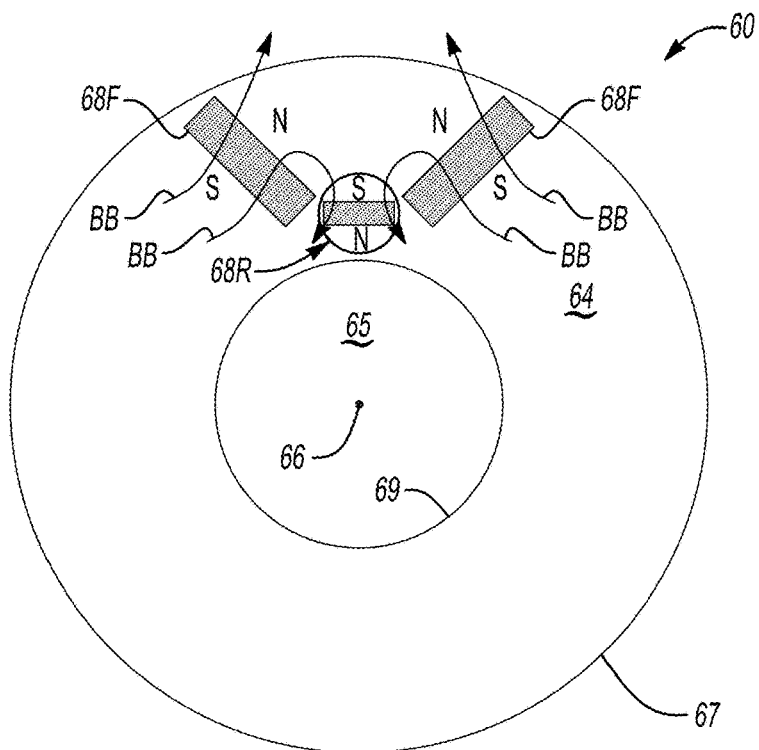
Figure 3C:
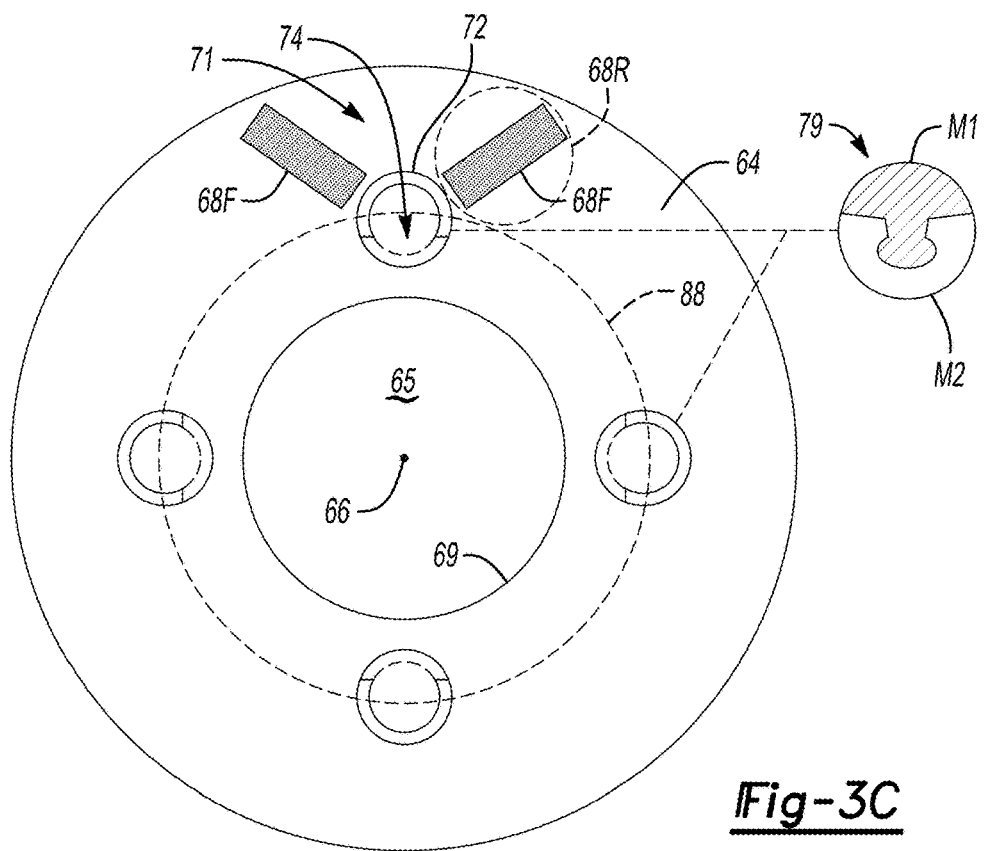

For illustrative simplicity, one set of fixed and magnets 68F and 68R are depicted schematically in FIGS. 3A-3C. However, as is well known in the art, the magnetic poles of a PM machine are distributed evenly around the circumference of the rotor 64, i.e., there are an equal number of north (N) and south (S) poles. Thus, flanking the depicted fixed magnets 68R and 68F is an identical set of rotatable and fixed magnets 68R and 68F, with the orientation of the rotatable magnets 68R possibly having different pole orientations, i.e., the south (S) magnetic poles oriented toward the stator 62 or any other orientation depending on the specific torque-speed operating point of the PM machine 16. As the rotor assembly 60 rotates about the axis of rotation 66 past a fixed point on the stator 62, therefore, such a point experiences alternating north and south poles to establish the requisite rotational forces.

The PM machine 16 disclosed herein also includes an actuator 70 as shown schematically in FIG. 3A, with the actuator 70 usable in the disclosed embodiments herein but omitted for illustrative simplicity. The actuator 70 ultimately imparts an actuating torque (arrow $T_A$) to the rotatable magnets 68R to cause the rotatable magnets 68R to rotate in a particular direction. The actuator 70, which may apply the actuating torque (arrow $T_A$) actively or passively in different embodiments as set forth below, is configured to selectively rotate the rotatable magnets 68R, e.g., at one or more predetermined operating points of the PM machine 16, through an angular distance sufficient for changing the above-noted magnetic pole orientations.

In other words, the magnetic north (N) pole of an illustrative one of the rotatable magnets 68R may be oriented as shown in FIG. 3A, e.g., at low-speed/high-torque conditions, and then rotated in FIG. 3B such that the magnetic south (S) poles of the rotatable magnet 68R is oriented toward the stator 62. The angular distance may vary to provide a desired level of flux weakening, e.g., the rotatable magnets 68R may be rotated anywhere from 0° to 180° or beyond. The amount of rotation ultimately modifies the magnetic flux paths BB between the rotor assembly 60 and the stator 62 to a corresponding extent.

Such a modification to the flux paths BB is schematically depicted in FIG. 3B. An example rotation of a particular one of the rotatable magnets 68R orients its magnetic south (S) pole toward the stator 62. With fixed magnets 68F oriented as shown, i.e., with its magnetic north (N) pole oriented toward the stator 62, the effect is one of flux weakening relative to the orientation of FIG. 3A, and as indicated by the different direction and size of the arrows corresponding to the flux paths BB. Part of the flux of the fixed magnets 68F now leaks through the rotatable magnets 68R due to reverse orientation of the rotatable magnets 68R. As a result, a level of flux linkage in the stator windings is reduced. Thus, the rotatable magnets 68R may be rotated when needed, and to the angular degree required, so as to situationally minimize or maximize flux linkage with the stator winding of the stator 62.

As an example application within the vehicle 10 of FIG. 1, for instance, magnetic flux linkage across the air gap 63 of FIGS. 3A and 3B may be reduced via rotation of the rotatable magnets 68R at a high speed and low torque of the PM machine 16, e.g., when operating in the relatively excessive flux area of zone Z in FIG. 2. In terms of actuation, in some embodiments the controller 50 of FIG. 1 may determine the speed and torque of the PM machine 16, such as via calculation, measurement, or lookup table, and then command the actuator 70 to rotate the rotatable magnets 68R when a threshold operating point is detected, e.g., speeds of the rotor shaft 65 being higher than a threshold speed and output torque of the rotor shaft 65 being lower than a threshold torque.

Figure 6:
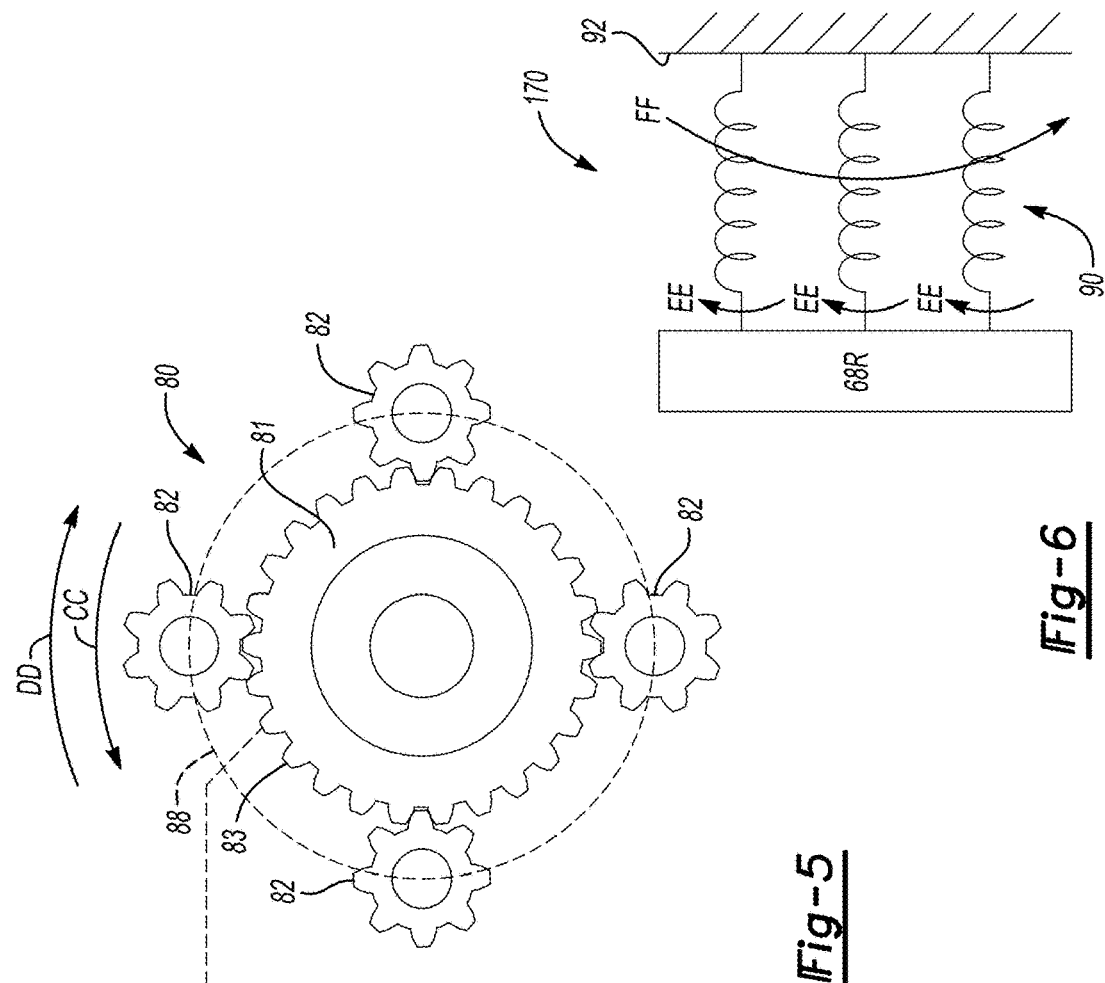
FIG. 6 is a schematic side view illustration of a passive alternative embodiment to that which is shown in FIG. 5.

Alternatively, the actuator 70 shown in FIG. 3A may be configured as a passive actuator 170 to provide passive actuation, i.e., without communication with the controller 50. As illustrated in FIG. 6, the passive actuator 170 may be configured to bias the rotatable magnets 68R in a first predetermined rotational direction (arrow EE) below a threshold acceleration force of the rotor 64 of FIGS. 3A-4B, and to enable rotation of the rotatable magnets 68R in a second predetermined rotational direction (arrow FF) above the threshold acceleration force of the rotor 64.

As an example, the passive actuator 170 may be equipped with rotary spring elements 90 or other passive biasing devices reacting against a stationary surface 92. The passive actuator 170 in such an embodiment may be configured with a calibrated return force sufficient for biasing the rotatable magnets 68R in a predetermined rotational direction, i.e., the direction indicated by arrows EE. Such a return force may be predetermined and calibrated based on the mass of the rotor assembly 60 such that the return force is overcome in response opposing acceleration forces of a threshold magnitude in the direction of arrow FF, i.e., rotational forces generated in a direction opposite to that of the return force.

FIG. 3C is an alternative embodiment to that which is depicted in FIGS. 3A and 3B. Here, a plurality of torque transfer elements 72 such as arcuate pieces, plates, or other suitable structure may be disposed within circular openings 74 defined in the rotor 64. The torque transfer elements 72 may be securely connected to an optional rotatable flux-shunting element 79 such that rotation of the torque transfer elements 72 within the circular openings 74 is sufficient to rotate the rotatable flux-shunting element 79 connected thereto.

Figure 7:
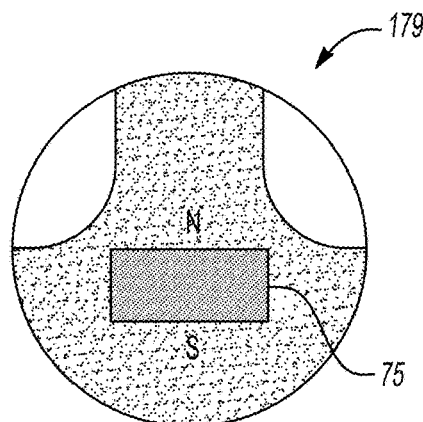
FIG. 7 is a schematic plan view illustration of an optional flux-shunting element usable with the PM machine of FIG. 1.

The flux-shunting element 79 may be used in some embodiments to enhance the effects of the above-described selective magnetic pole variation. For instance, the flux-shunting element 79 may be embodied as a combined piece of mild steel or other ferromagnetic metal and plastic or another disparate material, with the different materials M1 and M2 positioned diametrically opposite each other as shown. Or, the flux-shunting element 79 may be a single piece of ferromagnetic material having a non-uniform shape, e.g., as shown as the flux-shunting element 179 in FIG. 7 and described below. Aluminum or plastic may be used on one half of the flux-shunting element 79 of FIG. 3C with mild steel used on the other half, for example, and/or halves of different relative sizes or geometric shapes may be used as shown in FIG. 7. Thus, the materials having high relative magnetic permeability may be used to increase flux leakage, with the low relative permeability materials rotated into position to reduce flux leakage as needed.

Changing the angular position of the flux-shunting elements 79 further modifies the magnetic flux paths BB between the rotor 64 and the stator 62. Orientation of the flux-shunting elements 79 may be achieved by the actuator 70 or a separate actuator, e.g., a cam plate, or actuated passively in the different embodiments disclosed herein. Optionally, one of the magnets 68F of a given pole 71 may be replaced with a rotatable magnet 68R as shown in FIG. 4B, with flux variation occurring in response to rotation of the flux-shunting element 79 and/or the rotatable magnet 68R at each pole 71 around the perimeter of the rotor 64, with one such pole 71 depicted in FIG. 3A for illustrative simplicity.

Referring briefly to FIG. 7, a possible embodiment of the flux-shunting element 79 of FIG. 3C is a rotatable magnetic flux-shunting element 179, i.e., a structural element that combines disparate materials and/or geometry features of the above-described flux-shunting element 79 with a permanent magnet 75. Thus, the permanent magnet 75 may be connected to or formed integrally with the flux-shunting element 79 as part of the same rotatable structure. Such a rotatable magnetic flux-shunting element 179 may be attached to the torque transfer elements 72 shown in FIG. 3C, with flux variation achieved in two manners, i.e., through magnetic pole variation and by changing the orientation of the magnetically-disparate materials in the flux paths BB.

Figure 4A:
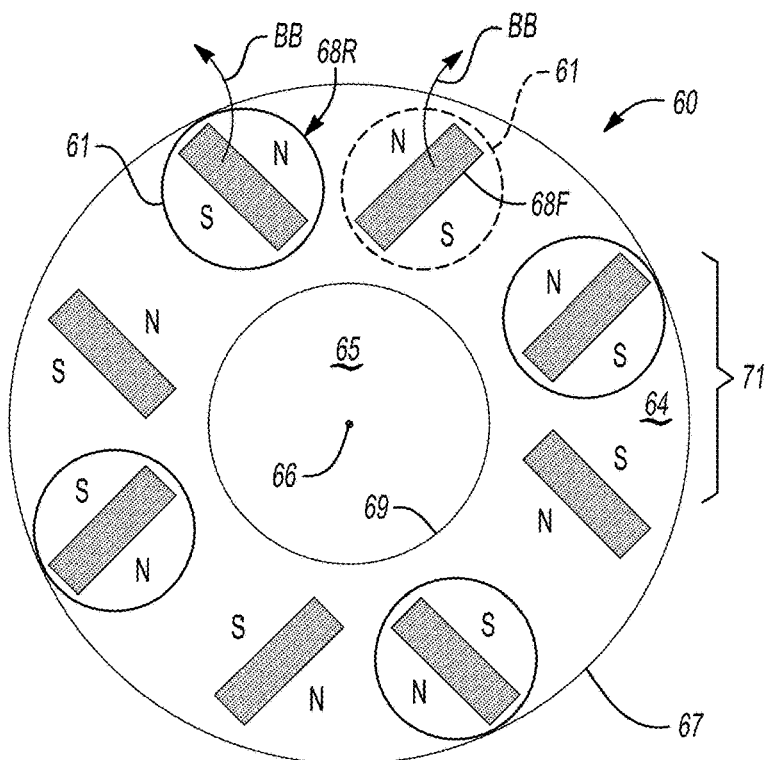
FIGS. 4A and 4B are schematic plan view illustrations of an alternative configuration of the rotor shown in FIGS. 3A-3C.
Figure 4B:
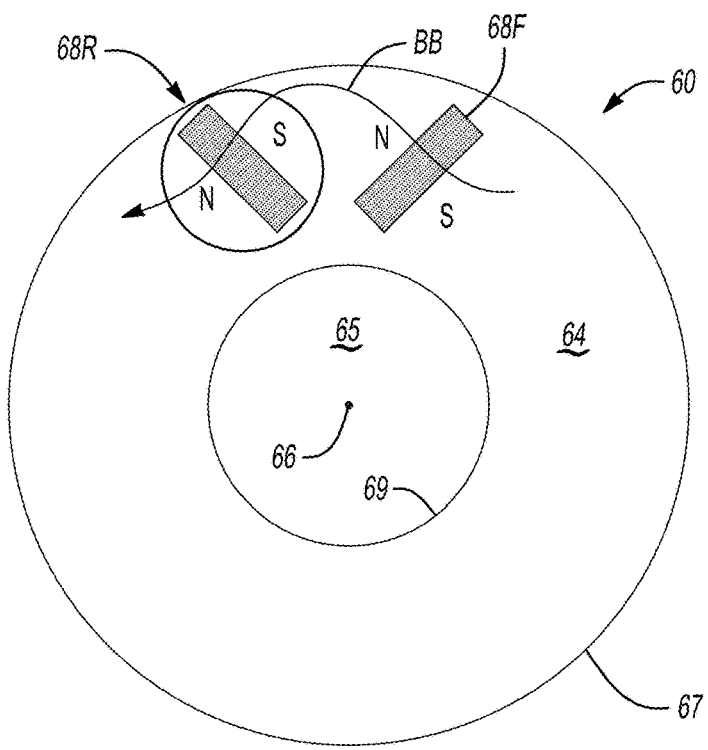

Referring to FIGS. 4A and 4B, in another possible configuration of the rotor 64, a respective one of the rotatable magnets 68R is positioned adjacent to a respective one of the fixed magnets 68F to form a given pole 71. FIG. 4A also shows an optional embodiment in which the fixed magnets 68F are replaced with another rotatable magnet 68R. In either embodiment, the relatively strong flux paths (BB) of FIG. 4A are weakened by rotation of one or both of the rotatable magnets 68R making up a given pole 71, with such flux weakening depicted in FIG. 4B. That is, in the angular position of FIG. 4B magnetic flux passes around the rotor 64 through a series of similarly-oriented magnets, with comparatively less of the magnetic flux passing into the stator 62.

Figure 5:
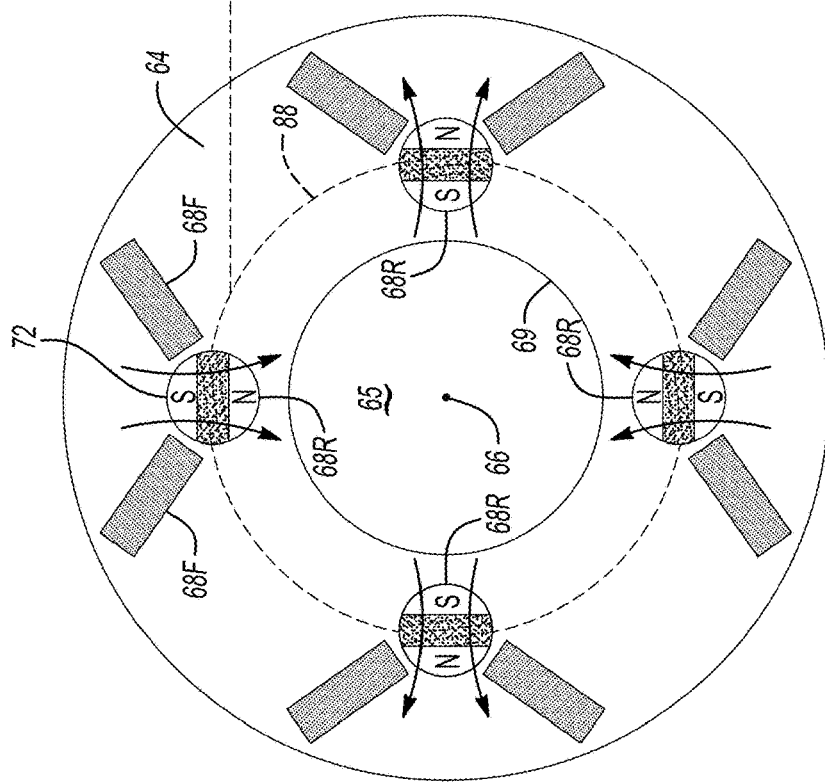
FIG. 5 is a schematic plan view illustration of a possible active embodiment for rotating a permanent magnet within the PM machine of FIGS. 3A-C and 4A-4B.

As noted above, rotation of the rotatable magnets 68R may be triggered by predetermined operating points and commanded by the controller 50 via the control signals (arrow $CC_O$) of FIG. 1. Referring briefly to FIG. 5, for example, a plurality of the torque transfer elements 72 noted above with reference to FIG. 3C, such as arcuate pieces, plates, or other suitable structure, may be disposed within circular openings 74 defined in the rotor 64. The torque transfer elements 72 may be securely connected to a respective one of the rotatable magnets 68R such that a rotation of the torque transfer elements 72 within the circular openings 74 is sufficient to rotate the rotatable magnets 68R connected thereto.

An approach for achieving such rotation uses a planetary gear set 80 or other gear arrangement disposed axially adjacent to the rotor 64 and configured to rotate the torque transfer elements 72 in response to a rotational force imparted to the gear set 80 by the actuator 70. The gear set 80 may include a sun gear 81 and multiple pinion gears 82 arranged evenly around the sun gear 81, i.e., a circle 88 passes through respective center points of the various pinion gears 82. The sun gear 81 may be rotatably driven by the actuator 70 of FIG. 3A, e.g., a rotary actuator in this embodiment. Rotation of the sun gear 81 in the direction of arrow CC would thus rotate the pinion gears 82 in the opposite direction of arrow DD. Centering and connecting the torque transfer elements 72 respectively on and to the pinion gears 82 would thus result in controlled rotation of the rotatable magnets 68R in the direction of arrow DD. The use of the variable magnetic pole features described above may be used to tune the performance of the electric machine 16 across a wide operating range, and to selectively increase or reduce flux linkage in a magnetic circuit formed between the rotor assembly 60 and the stator 62 of FIGS. 3A-4B.

Figure 8A:
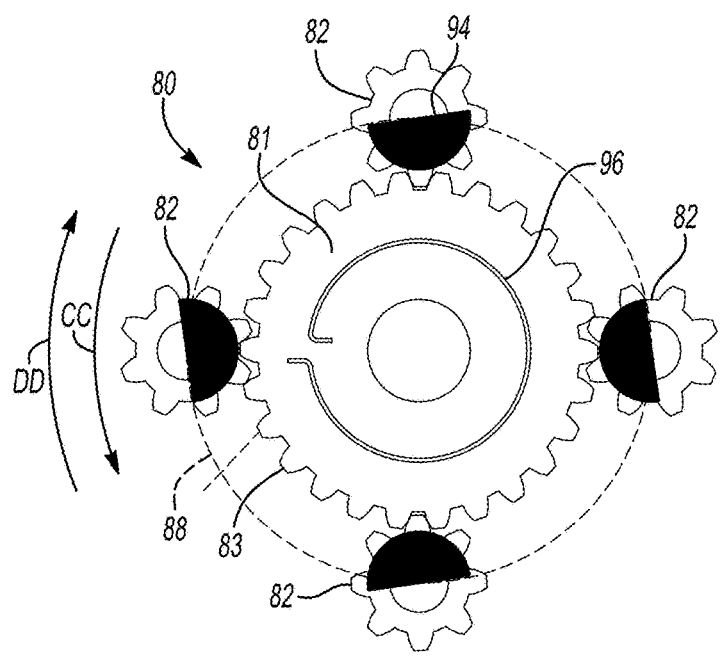
FIGS. 8A and 8B are schematic plan view illustrations of a possible flyweight-based passive variation of the configuration shown in FIG. 5.
Figure 8B:
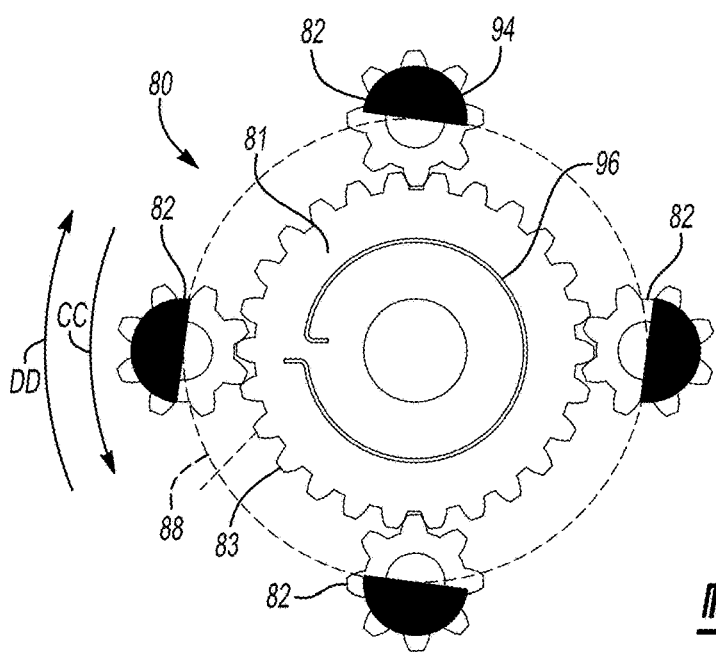

FIGS. 8A and 8B depict yet another embodiment in which the gear set 80 of FIG. 5 may be passively rotated using a suitably configured spring element 96, e.g., a clock spring as depicted, mounted with respect to the sun gear 81. Flyweights 94, for instance semicircular weights as shown, are disposed on each pinion gear 82 such that rotation of the gear set 80 occurs in response to acceleration of the rotor 64 described above. The rotation is counteracted in the direction of arrow DD by the return force of the spring element 96, with threshold acceleration forces above the spring force allowing rotation of the sun gear 81 in the direction of arrow CC. In other words, the flyweights 94 are configured to cause rotation of the pinion gears 82 in response to acceleration forces of the rotor 64 in excess of a predetermined return force of the spring element 96.

In view of the above-described PM machine 16, those of ordinary skill in the art will appreciate that a method for controlling flux in the PM machine 16 is also enabled, with requisite steps of such method possibly encoded in memory (M) of the controller 50 of FIG. 1 as the instructions 100. For instance, such a method may include connecting a plurality of the rotatable magnets 68R to the rotor 64 of FIGS. 3A-4B such that the rotatable magnets 68R have a respective north-south magnetic pole orientation, and then positioning the stator 62 (see FIG. 3A) with respect the rotor 64 such that the stator 62 circumscribes the rotor 64 and defines the air gap 63 in conjunction therewith. In other embodiments, the stator 62 and rotor 64 may be axially-aligned such that the air gap 63 is defined in an axial direction between the stator 62 and rotor 64, as opposed to the radial spacing depicted herein.

Thereafter, such a method includes selectively rotating the rotatable magnets 68R, via the actuator 70 in its various embodiments, at one or more predetermined operating points of the PM machine 16. Such rotation occurs through an angular distance sufficient for changing the respective north-south magnetic pole orientations and thereby modifying the magnetic flux paths BB between the rotor 64 and the stator 62 across the air gap 63. As part of such a method, the actuator 70 of FIG. 3A may be used to rotate the gear set 80 of FIG. 5, which is connected to a torque transfer elements 72. Or, the actuator 70 in such a method may be a passive actuator 170 as shown in FIG. 6, and thus configured to bias the rotatable magnets 68R as explained above.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A permanent magnet electric machine (PM machine) comprising:
   a rotor assembly having a generally cylindrical rotor, a plurality of fixed magnets rigidly mounted to the rotor, and a plurality of rotatable magnets each movably mounted to the rotor to rotate on a respective center axis at a center of the rotatable magnet and each having respective magnetic poles with a respective north-south magnetic pole orientation, wherein each of the rotatable magnets is disposed with at least one of the magnetic poles thereof located between a respective pair of the fixed magnets and with the center axis thereof positioned radially inward from the respective pair of the fixed magnets;
   a stator separated from the rotor by an air gap and bearing a plurality of stator windings; and
   an active or passive actuator operatively connected to the rotatable magnets and configured to selectively rotate the plurality of rotatable magnets at one or more operating points of the PM machine to change the respective north-south magnetic pole orientations and thereby modify a level of magnetic flux linkage with the stator windings across the air gap.

2. The PM machine of claim 1, wherein the fixed magnets are spaced from one another around a circumference of the rotor and arranged in V-shaped pairs.

3. The PM machine of claim 2, wherein each of the rotatable magnets is positioned adjacent to radially innermost ends of the fixed magnets in the respective pair of the fixed magnets.

4. The PM machine of claim 1, wherein the operating points include a torque-speed operating point of the PM machine, and wherein the torque-speed operating point corresponds to a rotational speed of the rotor exceeding a threshold speed, and an output torque of the rotor that is less than a threshold torque.

5. The PM machine of claim 1, further comprising:
   a controller in communication with the actuator and configured to output thereto an electronic control signal,
   wherein the actuator is an active rotary actuator configured to rotate the rotatable magnets in response to the control signal from the controller.

6. The PM machine of claim 1, wherein the actuator is a passive actuator comprising one or more rotary spring elements coupled to the rotatable magnets and configured to bias the rotatable magnets in a first rotational direction below a threshold acceleration force of the rotor, and to permit rotation of the rotatable magnets in a second predetermined rotational direction above the threshold acceleration force.

7. The PM machine of claim 1, further comprising: at least one flux-shunting element movably mounted to the rotor and having non-uniform magnetic permeability properties on opposite halves of the at least one flux-shunting element.

8. The PM machine of claim 7, wherein at least one of the rotatable magnets is connected to or formed integrally with the at least one flux-shunting element.

9. The PM machine of claim 1, further comprising:
   a plurality of torque transfer elements driven by the actuator, wherein each of the rotatable magnets includes a permanent magnet mounted to a respective one of the torque transfer elements; and
   a gear set having multiple pinion gears rotatably engaged with a sun gear, each of the pinion gears being connected to a respective one of the torque transfer elements.

10. The PM machine of claim 9, wherein the actuator is a passive actuator comprising:
a spring element connected to the sun gear; and
a plurality of flyweights each connected to a respective one of the pinion gears, wherein the flyweights are configured to cause rotation of the pinion gears in response to acceleration forces of the rotor in excess of a return force of the spring element.

11. A vehicle comprising:
drive wheels;
a transmission having an input member and an output member, the output member being connected to the drive wheels; and
a permanent magnet electric machine (PM machine) coupled to the input member and configured to deliver motor torque to the input member, the PM machine having:
  a rotor assembly having a rotor shaft, a rotor coaxially surrounding and coupled to the rotor shaft, a plurality of fixed magnets rigidly mounted to the rotor, and a plurality of rotatable magnets each of which is movably mounted to the rotor to rotate on a respective center axis at a center of the rotatable magnet and has respective magnetic poles with a respective north-south magnetic pole orientation, wherein each of the rotatable magnets is disposed with at least one of the magnetic poles thereof located between a respective pair of the fixed magnets and with the center axis thereof positioned radially inward from the respective pair of the fixed magnets;
  a stator separated from the rotor by an air gap and bearing a stator winding; and
  an active or passive actuator operatively connected to the rotatable magnets and configured to selectively rotate the plurality of rotatable magnets at one or more predetermined operating points of the PM machine to change the respective north-south magnetic pole orientations and thereby modify a level of magnetic flux linkage with the stator windings across the air gap.

12. The vehicle of claim 11, wherein the fixed magnets are spaced from one another around a circumference of the rotor and arranged in V-shaped pairs.

13. The vehicle of claim 11, wherein the center axis of each of the rotatable magnets is positioned radially inward from innermost ends of the fixed magnets in the respective pair of the fixed magnets.

14. The vehicle of claim 11, wherein the one or more predetermined operating points include a predetermined torque-speed operating point of the PM machine, and wherein the predetermined torque-speed operating point corresponds to a rotational speed of the rotor exceeding a threshold speed, and an output torque of the rotor that is less than a threshold torque.

15. The vehicle of claim 11, further comprising:
a controller in communication with the actuator and configured to output thereto an electronic control signal,
wherein the actuator is an active rotary actuator configured to rotate the rotatable magnets in response to the control signal from the controller.

16. The vehicle of claim 11, wherein the actuator is a passive actuator comprising one or more rotary spring elements coupled to the rotatable magnets and configured to bias the rotatable magnets in a first rotational direction below a threshold acceleration force of the rotor, and to permit rotation of the rotatable magnets in a second predetermined rotational direction above the threshold acceleration force of the rotor.

17. The vehicle of claim 11, wherein the PM machine further includes at least one flux-shunting element movably mounted to the rotor and having non-uniform magnetic permeability properties on opposite halves of the at least one flux-shunting element.

18. A method for controlling flux linkage in a permanent magnet electric machine (PM machine), the method comprising:
connecting a plurality of rotatable magnets to a rotor of a rotor assembly such that the rotatable magnets each rotates on a respective center axis at a center of the rotatable magnet and each has respective magnetic poles with a respective north-south magnetic pole orientation, the rotor assembly having a plurality of fixed magnets rigidly mounted to the rotor, wherein each of the rotatable magnets is disposed with at least one of the magnetic poles thereof located between a respective pair of the fixed magnets and with the center axis thereof positioned radially inward from the respective pair of the fixed magnets;
positioning a stator with respect the rotor such that the stator and rotor together define an air gap, the stator bearing a plurality of stator windings; and
selectively rotating the plurality of rotatable magnets, via an active or passive actuator operatively connected to the rotatable magnets, at one or more predetermined operating points of the PM machine to change the respective north-south magnetic pole orientations and thereby modify the magnetic flux linkage with the stator windings across the air gap.

19. The method of claim 18, wherein selectively rotating the plurality of rotatable magnets includes using the actuator to rotate a gear set connected to a plurality of torque transfer elements connected to the rotatable magnets.

20. The method of claim 18, wherein the actuator is a passive actuator configured to bias the rotatable magnets in a first rotational direction below a threshold acceleration force of the rotor, and wherein selectively rotating the plurality of rotatable magnets includes permitting rotation of the rotatable magnets in a second predetermined rotational direction opposite the first rotational direction above the threshold acceleration force of the rotor.

* * * * *